United States Patent
Howe et al.

(10) Patent No.: US 10,583,391 B2
(45) Date of Patent: Mar. 10, 2020

(54) ABSORBENT APPARATUS FOR AN AIR DRYER PURGE AIR CLEANER AND METHOD OF PRODUCING THE SAME

(71) Applicant: Bendix Commercial Vehicle Systems LLC, Elyria, OH (US)

(72) Inventors: Stephen Howe, Cuyahoga Falls, OH (US); David W Perry, North Ridgeville, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 147 days.

(21) Appl. No.: 15/845,499

(22) Filed: Dec. 18, 2017

(65) Prior Publication Data

US 2019/0184333 A1    Jun. 20, 2019

(51) Int. Cl.
*B01D 29/00* (2006.01)
*B60T 17/00* (2006.01)
(Continued)

(52) U.S. Cl.
CPC ........... *B01D 53/261* (2013.01); *B01D 29/00* (2013.01); *B01D 53/0407* (2013.01); *B01D 53/28* (2013.01); *B01J 20/262* (2013.01); *B01J 20/28045* (2013.01); *B01J 20/3092* (2013.01); *B60T 17/004* (2013.01); *B01D 2253/202* (2013.01); *B01D 2253/3425* (2013.01); *B01D 2257/702* (2013.01); *B01D 2257/80* (2013.01);
(Continued)

(58) Field of Classification Search
CPC .. B01D 53/261; B01D 53/0407; B01D 53/28; B01D 2253/202; B01D 2253/3425; B01D 2257/702; B01D 2257/80; B01D 2259/40086; B01D 2259/4566; B01J 20/262; B01J 20/28045; B01J 20/3092; B60T 17/004
USPC ........ 96/108, 149; 95/141, 143; 55/DIG. 17, 55/512–519
See application file for complete search history.

(56) References Cited

U.S. PATENT DOCUMENTS 5,039,414 A * 8/1991 Mueller ............. B01D 17/0202
                                                            134/6
5,186,522 A    2/1993 Spencer
(Continued)

FOREIGN PATENT DOCUMENTS

DE    102006002975 B4    1/2008
EP       2471588 B1    11/2014
(Continued)

OTHER PUBLICATIONS

Bendix Commercial Vehicle Systems, "SD-08-187 Bendix PuraGuard System Filter," Service Data Sheet, Jul. 2004, 8 pages, Bendix Commercial Vehicle Systems LLC, Elyria Ohio, U.S.A.
(Continued)

*Primary Examiner* — Frank M Lawrence, Jr.
(74) *Attorney, Agent, or Firm* — Cheryl Greenly; Brian Kondas; Eugene Clair (57) ABSTRACT

An absorbent apparatus is provided for an air dryer purge air cleaner. The absorbent apparatus comprises a volume for containing absorbent material. The absorbent apparatus also comprises absorbent material that is both oleophilic and hydrophobic and is packed in the volume to provide a packed bed of absorbent material with a predetermined packing density.

12 Claims, 6 Drawing Sheets

(51) Int. Cl.
  *B01D 53/26* (2006.01)
  *B01D 53/28* (2006.01)
  *B01D 53/04* (2006.01)
  *B01J 20/26* (2006.01)
  *B01J 20/28* (2006.01)
  *B01J 20/30* (2006.01)

(52) U.S. Cl.
  CPC ............. *B01D 2258/06* (2013.01); *B01D 2259/40086* (2013.01); *B01D 2259/4566* (2013.01)

(56) References Cited

U.S. PATENT DOCUMENTS

| | | | |
|---|---|---|---|
| 6,109,289 | A | 8/2000 | Firth |
| 6,319,296 | B1 | 11/2001 | Fornof |
| 6,537,339 | B2 | 3/2003 | Schmitz |
| 6,730,143 | B1 | 5/2004 | Nichols |
| 7,708,793 | B2 | 5/2010 | Fornof |
| 7,753,069 | B2 | 7/2010 | Nichols |
| 7,789,925 | B2 | 9/2010 | Fornof |
| 8,753,436 | B1 * | 6/2014 | Curtsinger ........... B01D 46/001 55/318 |
| 9,101,856 | B2 | 8/2015 | Quinn |
| 9,656,198 | B2 | 5/2017 | Sugio |
| 2012/0010070 | A1 | 1/2012 | Bluecher |
| 2015/0135961 | A1 * | 5/2015 | Sugio ................. F01N 3/037 96/381 |
| 2015/0194667 | A1 * | 7/2015 | Chiu .................... H01M 4/362 429/199 |
| 2016/0069035 | A1 | 3/2016 | Wang |
| 2017/0021300 | A1 * | 1/2017 | Sugio ................. B01D 45/08 |
| 2017/0340997 | A1 | 11/2017 | Otsuka |
| 2019/0099705 | A1 * | 4/2019 | Howe ................... B01D 45/16 |

FOREIGN PATENT DOCUMENTS

| | | |
|---|---|---|
| EP | 3216509 A1 | 9/2017 |
| GB | 1094617 A | 12/1967 |
| JP | 20050664470 A | 3/2005 |

OTHER PUBLICATIONS

Choi, Sung-Jin et al. "A Polymethylsiloxane (PDMS) Sponge for the Selective Absorption of Oil from Water," Paper, Nov. 10, 2011, 5 pages, American Chemical Society, U.S.A.
Parker Hannifin Manufacturing Limited, "OVR Oil Vapour Removal Filter," Product Information Sheet, Apr. 2015, 4 pages, Parker Hannifin Manufacturing Limited, England.
European Patent Office, "Notification of Transmittal of the International Search Report and the Written Opinion of the International Searching Authority," Report, Apr. 16, 2019, 6 pages, European Patent Office, Rijswijk Netherlands.
European Patent Office, "Information on Search Strategy," Report, Apr. 16, 2019, 1 page, European Patent Office, Rijswijk Netherlands.
European Patent Office, "Written Opinion of the International Searching Authority," Report, Apr. 16, 2019, 10 pages, European Patent Office, Rijswijk Netherlands.
Shi Qiu, "Moldable clay-like unit for synthesis of highly elastic polydimethlsiloxane sponge with nanofiller modification," Paper, Jan. 1, 2017, 8 pages, RSC Advances, vol. 7, No. 17, DOI: 10.1039/C6RA26701G.
A. Turco, "A magnetic and highly reusable macroporous superhydrophobic/superoleophilic PDMS/MWNT nanocomposite for oil sorption from water," Paper, Jan. 1, 2015, 12 pages, Journal of Material Chemistry, DOI: 10.1039/c5ta04353k.
A.C. Festo, "Compressed air preparation in pneumatics," White Paper, Dec. 31, 2015, 15 pages, Festo AG & Co. KG.
E. David, "Mechanical strength and reliability of the porous materials used as adsorbents/catalysts and the new development trends," Paper, May 30, 2015, 13 pages, Archives of Materials Science and Engineering, vol. 73, Issue 1.
Kim, "UV-responsive nano-sponge for oil absorption and desorption," Paper, Jan. 1, 2017, 12 pages, Scientific Reports, vol. 5, No. 1, DOI: 10.1038/srep12908.
Deyong, "Recent progress in fabrication and application of polydimethylsiloxane sponges," Paper, Jan. 1, 2017, 32 pages, Journal of Materials Chemistry A, vol. 5, No. 32, DOI: 10.1039/C7TAO4577H.

* cited by examiner

ABSORBENT APPARATUS FOR AN AIR DRYER PURGE AIR CLEANER AND METHOD OF PRODUCING THE SAME

BACKGROUND

The present application relates to air dryer purge air cleaners, and is particularly directed to an absorbent apparatus for an air dryer purge air cleaner and method of producing the same. As an example, the absorbent apparatus can be used in a vehicle air brake charging system, such as a truck air brake charging system.

A truck air brake charging system includes a vehicle air compressor which builds air pressure for an air braking system. The compressor is typically lubricated by an engine oil supply. A governor controls system air pressure between a preset maximum and minimum pressure level by monitoring the air pressure in a supply reservoir. When the supply reservoir air pressure becomes greater than that of a preset "cut-out" setting of the governor, the governor controls the compressor to stop the compressor from building air and also causes an air dryer downstream from the compressor to go into a purge mode. As the supply reservoir air pressure drops to a preset "cut-in" setting of the governor, the governor returns the compressor back to building air and the air dryer to air drying mode.

The air dryer is an in-line filtration system that removes water vapor, water droplets, oil droplets, and oil aerosols from the compressor discharge air after it leaves the compressor. This results in cleaner, drier air being supplied to the air braking system, and aids in the prevention of air line and component freeze ups in winter weather. The air dryer typically uses a replaceable cartridge containing a desiccant material and an oil separator. Most of the oil droplets are removed by the oil separator as the air passes into the air dryer. The air then moves through the desiccant material which removes most of the water vapor.

When the air pressure in the supply reservoir reaches the preset cut-out setting of the governor, the governor makes the compressor stop building air and allows the air dryer's "purge cycle" to begin. During the purge cycle, the desiccant material is regenerated (i.e., its ability to remove water is renewed) by a reversal of the saturation process. A small amount of dry air passes back through the desiccant material and the water that has been collected, as well as any oil droplets collected by the oil separator, are purged out through a purge valve to atmosphere. Since the purged air from the purge valve contains oil droplets, this results in depositing of oil onto roadways by the truck. In some known truck air brake charging systems, the purged air passes through a purge air cleaner to remove oil contained in the purged air before directing the cleaned air to atmosphere. Accordingly, those skilled in the art continue with research and development efforts in using purge air cleaners to remove oil contained in purged air from purge valves.

SUMMARY

In one aspect, an absorbent apparatus is provided for an air dryer purge air cleaner. The absorbent apparatus comprises a volume for containing absorbent material. The absorbent apparatus also comprises absorbent material that is both oleophilic and hydrophobic and is packed in the volume to provide a packed bed of absorbent material with a predetermined packing density.

In another aspect, an absorbent apparatus is provided for an air dryer purge air cleaner of a vehicle air brake charging system. The absorbent apparatus comprises a separating sump having a volume for containing absorbent material. The absorbent apparatus also comprises absorbent sponges comprising an absorbent material that is both oleophilic and hydrophobic, wherein the absorbent sponges are packed in the volume of the separating sump to provide a packed bed of absorbent sponges having a predetermined packing density between about 64% and about 91%.

In yet another aspect, a method is provided of producing an absorbent apparatus for an air dryer purge air cleaner. The method comprises filling a volume with absorbent sponges that are both oleophilic and hydrophobic, and compressing the absorbent sponges contained in the volume until a predetermined packing density of the absorbent sponges is reached.

DETAILED DESCRIPTION

The present disclosure is directed to an absorbent apparatus for an air dryer purge air cleaner and method of producing the same. The specific construction of the absorbent apparatus and the industry in which the absorbent apparatus is implemented may vary. It is to be understood that the disclosure below provides a number of embodiments or examples for implementing different features of various embodiments. Specific examples of components and arrangements are described to simplify the present disclosure. These are merely examples and are not intended to be limiting.

Figure 1:
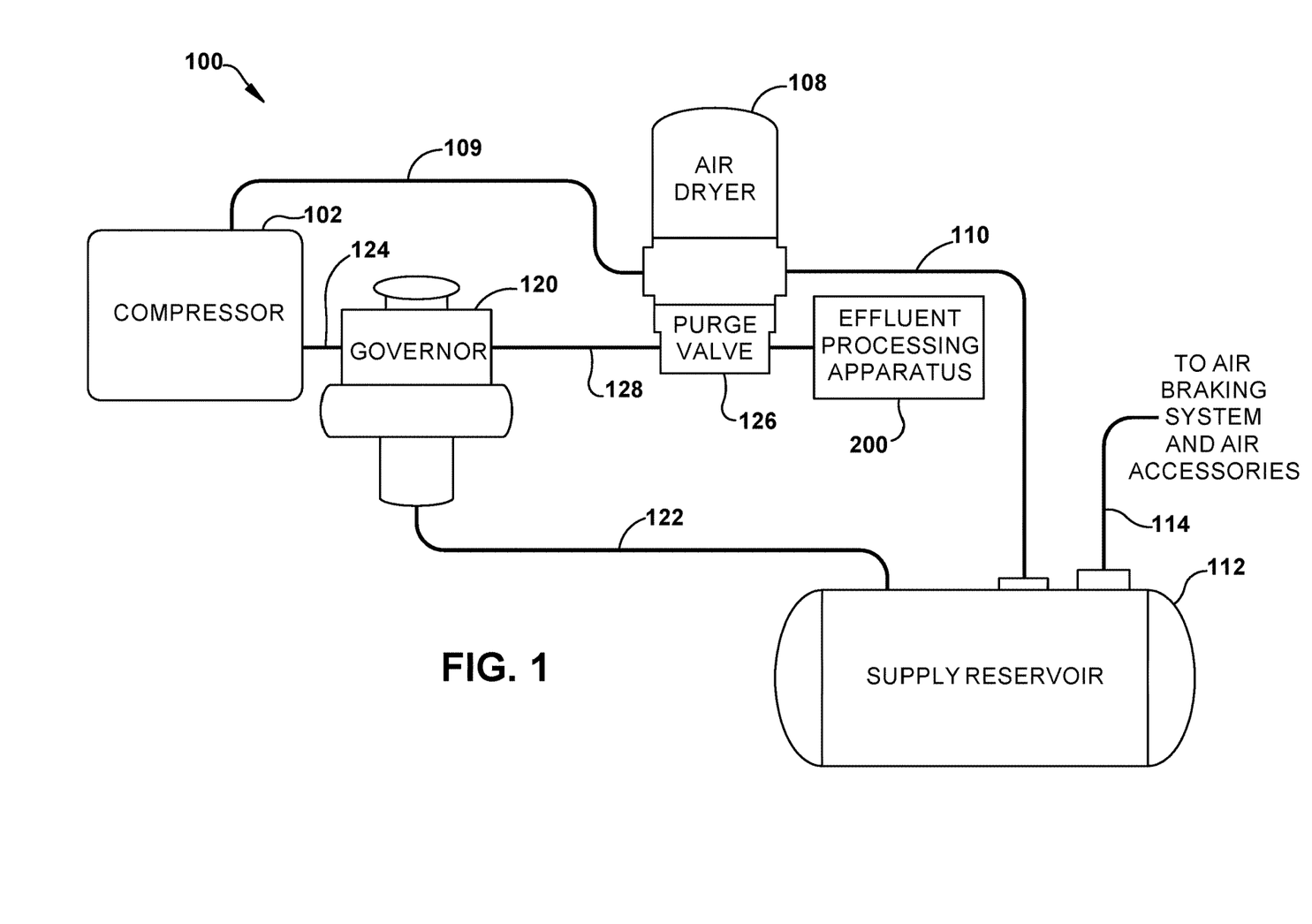
FIG. 1 is a schematic diagram of an example vehicle air brake charging system including an effluent processing apparatus constructed in accordance with an embodiment.

Referring to FIG. 1, a schematic diagram of an example vehicle air brake charging system 100 including an effluent processing apparatus 200 constructed in accordance with an embodiment is illustrated. Vehicle air brake charging system 100 includes an air compressor 102 that generates compressed air in conventional manner. Structure and operation of air compressors are known and, therefore, will not be described.

A first discharge line 109 is pneumatically connected between the compressor 102 and an air dryer 108. A second discharge line 110 is pneumatically connected between the air dryer 108 and a supply reservoir 112. Air supply line 114 is pneumatically connected between the supply reservoir 112 and air braking system and air accessories (not shown) of the vehicle.

A governor 120 controls system air pressure between a preset maximum and minimum pressure level by monitoring the air pressure in pneumatic control line 122 from the supply reservoir 112. When air pressure in the supply reservoir 112 becomes greater than that of a preset "cut-out" setting of the governor 120, the governor controls the compressor 102 on pneumatic control line 124 to stop the compressor from building air. The governor 120 also controls a purge valve 126 on pneumatic control line 128 to purge air from the air dryer 108 in a purge mode. When air pressure in the supply reservoir 112 drops to a preset "cut-in" setting of the governor 120, the governor returns the compressor 102 back to building air and the air dryer 108 to an air drying mode.

Figure 2:
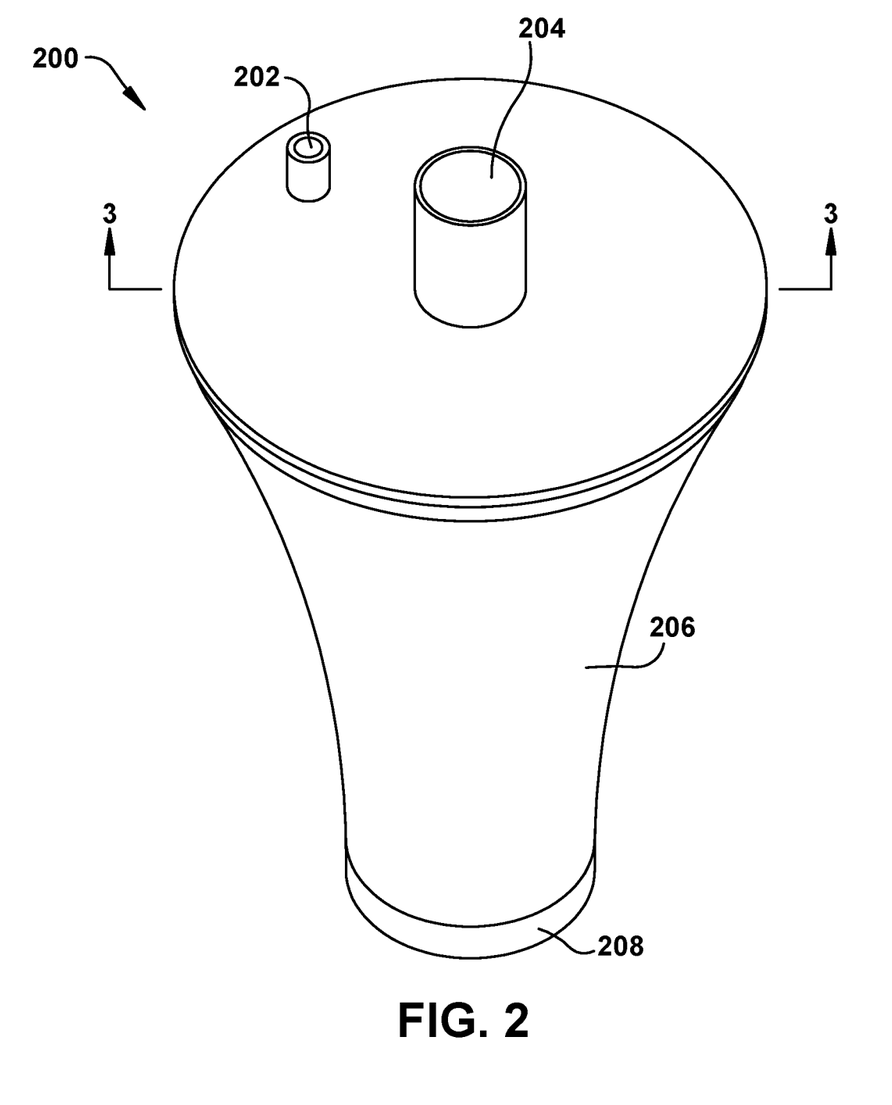
FIG. 2 is a perspective view of an example effluent processing apparatus that can be implemented in the vehicle air brake charging system shown in FIG. 1.

Referring to FIG. 2, a perspective view of an example effluent processing apparatus 200 that can be implemented in the vehicle air brake charging system 100 shown in FIG. 1 is illustrated. The effluent processing apparatus 200 includes an inlet port portion 202, an outlet port portion 204, a quadric surface portion 206, and a separating sump portion 208, as will be described hereinbelow. Example overall physical dimensions of the effluent processing apparatus 200 are between about two inches (5.1 centimeters) and ten inches (25.4 centimeters) in diameter, and no greater than about ten inches (25.4 centimeters) in height.

Figure 3:
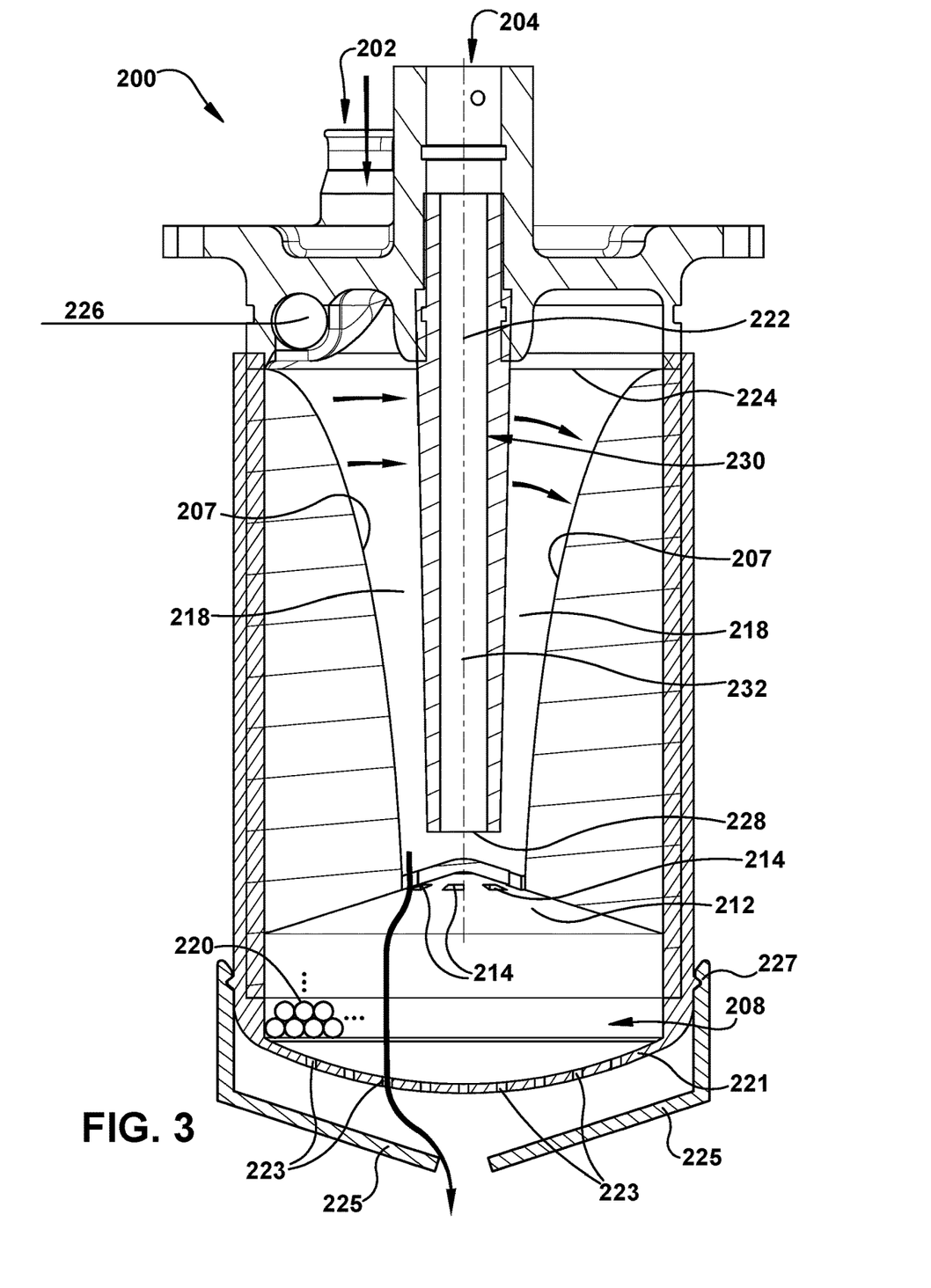
FIG. 3 is a sectional view taken approximately along line 3-3 shown in FIG. 2, and showing details in the effluent processing apparatus.

Referring to FIG. 3, a sectional elevation view taken approximately along line 3-3 shown in FIG. 2 is illustrated. In particular, FIG. 3 shows details of an example quadric surface 207 in the effluent processing apparatus 200. The example quadric surface 207 shown in FIG. 3 is an inverted paraboloid. The quadric surface 207 is sometimes referred to as a "quadratic surface" that is represented by a corresponding quadratic equation. Relationships between quadric surfaces and their corresponding quadratic equations are known and, therefore, will not be described.

The quadric surface 207 defines an effluent flow chamber 218 that is connected in fluid communication between the inlet port 202 and the outlet port 204. Effluent from the purge valve 126 of the air dryer 108 (FIG. 1) is received in line with the inlet port 202. The quadric surface 207 has a center axis 222. The quadric surface 207 is provided for extracting contaminants from an effluent stream as the effluent stream flows from the inlet port 202 along the quadric surface 207 to the outlet port 204. Contaminants in the effluent stream include, but are not limited to, water vapor, water droplets, and oil droplets in an aerosol. In some embodiments, a select one or more of a fine mesh, sponge, and coalescing media is coated and/or adhered on the quadric surface 207 for increasing contaminant extraction efficiency of the quadric surface 207.

As shown in FIG. 3, an inlet opening 224 to the effluent flow chamber 218 is provided through which effluent from the purge valve 126 of the air dryer 108 can be received. The inlet opening 224 is located at one end of the effluent flow chamber 218. An air entrance 226 interconnects the inlet port 202 and the inlet opening 224. The air entrance 226 changes the effluent flow direction from a vertical flow at the inlet port 202 to a horizontal flow at the inlet opening 224, and directs the effluent to flow tangential to the quadric surface 207. An outlet opening 228 that is smaller than the inlet opening 224 is provided at the opposite end of the effluent flow chamber 218. Accordingly, the effluent stream flows from the relatively larger inlet opening 224 to the relatively smaller outlet opening 228 as the effluent stream flows through the effluent flow chamber 218.

Also as shown in FIG. 3, a stand pipe 230 has one end disposed in the effluent flow chamber 218 and an opposite end connected to the outlet port 204. The stand pipe 230 has a longitudinal central axis 232 that is concentric to the center axis 222 of the quadric surface 207.

The separating sump 208 contains filtration media 220, designated as small circles, in the separating sump 208. The separating sump 208 containing the filtration media 220 is disposed in the vicinity of the outlet opening 228. The separating sump 208 is disposed below the quadric surface 207 and the stand pipe 230 as shown in FIG. 3. The separating sump 208 has a floor 212 with a number of floor openings 214 that allow fluid communication between the effluent flow chamber 218 and the volume of the separating sump 208 containing the filtration media 220.

The separating sump 208 containing the filtration media 220 is provided for receiving and holding extracted contaminants until the extracted contaminants can be removed from the separating sump 208. In some embodiments, the filtration media 220 includes a sponge material that is both oleophilic and hydrophobic (i.e., having an affinity for oil while rejecting or expelling water). In some embodiments, the filtration media 220 includes a generic hydrophobic material. In some embodiments, the separating sump 208 containing filtration media 220 is detachable as a cartridge to allow the separating sump 208 to be removed as a unit and replaced with another separating sump.

The separating sump 208 has a bottom panel 221 that has a number of drain openings 223 dispersed throughout the bottom panel 221. A baffle system 225 protects the drain openings 223. The baffle system 225 is secured to the separating sump 208 using a snap-on mechanism 227, or otherwise fastened or joined.

As liquids separate apart from the effluent stream, the liquids run down walls of the quadric surface 207 and drain through the floor openings 214 in the floor 212 into the volume of the separating sump 208 containing the filtration media 220. The filtration media 220 holds the oil contaminants contained in the separated liquid, and the water contained in the separated liquid is allowed to drain through the drain openings 223 in the bottom panel 221. The filtration media 220 holds the oil contaminants until the filtration media 220 or the separating sump 208, or both, are replaced. The effluent stream with the contaminants (i.e., the oil and the water) removed then flows upward through the stand pipe 230 and out through the outlet port 204 to atmosphere.

Various embodiments of the present disclosure may be described in the context of an absorbent apparatus for an air dryer purge air cleaner of a vehicle air brake charging system. The absorbent apparatus comprises the separating sump 208 having the volume for containing absorbent material. The absorbent apparatus also comprises absorbent material (i.e., the filtration media 220) packed in the volume of the separating sump 208 to provide a packed bed of absorbent material with a predetermined packing density. Packing density (or packing fraction) is defined as the ratio of the volume taken up by the absorbent material to the total volume of the separating sump 208.

The desired predetermined packing density can be achieved by either adding more absorbent material in a given volume or compressing the absorbent material into a smaller volume. As examples, the absorbent material can be pre-packaged in a given volume such as a mesh bag, a permeable sack, or a permeable cartridge. Other types of volumes are possible.

Figure 4A:
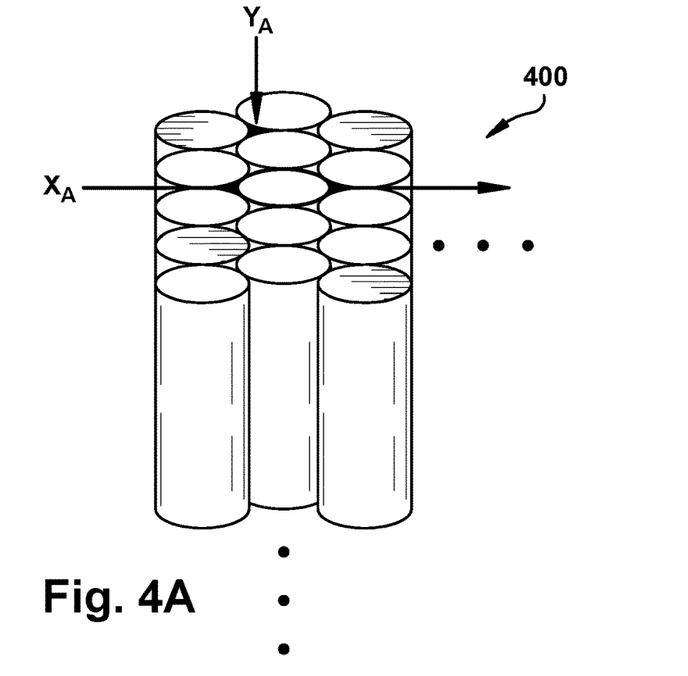
FIG. 4A is a schematic representation of an example packed bed of cylinder-shaped sponges contained in the effluent processing apparatus of FIG. 2.

Referring to FIG. 4A, a schematic representation of an example packed bed of cylinder-shaped sponges contained in the effluent processing apparatus 200 of FIG. 2 is illustrated. More specifically, FIG. 4A shows a schematic representation of the filtration media 220 in the form of a packed bed of cylinder-shaped sponges 400 contained in the effluent processing apparatus 200 of FIG. 2. The cylinder-shaped sponges 400 are arranged in a log configuration. The cylinder-shaped sponges 400 are substantially the same size and have a packing density (i.e., the ratio of the volume taken up by the sponges to the total volume of the separating sump 208) between about 72% and about 91%. In some embodiments, at least a portion of at least some of the sponges 400 are comprised of an open cell structure.

In some embodiments, at least some of the cylinder-shaped sponges 400 are comprised of polydimethylsiloxane (PDMS). Alternatively, the sponges 400 can be coated with an oleophilic and/or a hydrophobic polymer. As an example, cellulose or polyurethane can be coated to give oleophilic and hydrophobic properties.

When the effluent stream flows "radially" towards the cylinder-shaped sponges 400 (i.e., in the direction of arrow "$X_A$" shown in FIG. 4A) in the log configuration of FIG. 4A, the effluent stream flows radially between the outer circumferential surfaces of the sponges. When the effluent stream flows "axially" towards the cylinder-shaped sponges 400 (i.e., in the direction of arrow "$Y_A$" shown in FIG. 4A) in the log configuration of FIG. 4A, the effluent stream flows axially in the longitudinal spaces between the sponges.

The $Y_A$ flow path is more direct than the $X_A$ flow path, and allows the effluent stream to pass more easily through the cylinder-shaped sponges 400. As such, the sponges 400 have less time to absorb oil in the $Y_A$ flow path as compared to the $X_A$ flow path. In contrast, the $X_A$ flow path is more convoluted than the $Y_A$ flow path, and slows down the effluent stream as it passes through the cylinder-shaped sponges 400. As such, the sponges 400 have more time to absorb oil in the $X_A$ flow path as compared to the $Y_A$ flow path.

Figure 4B:
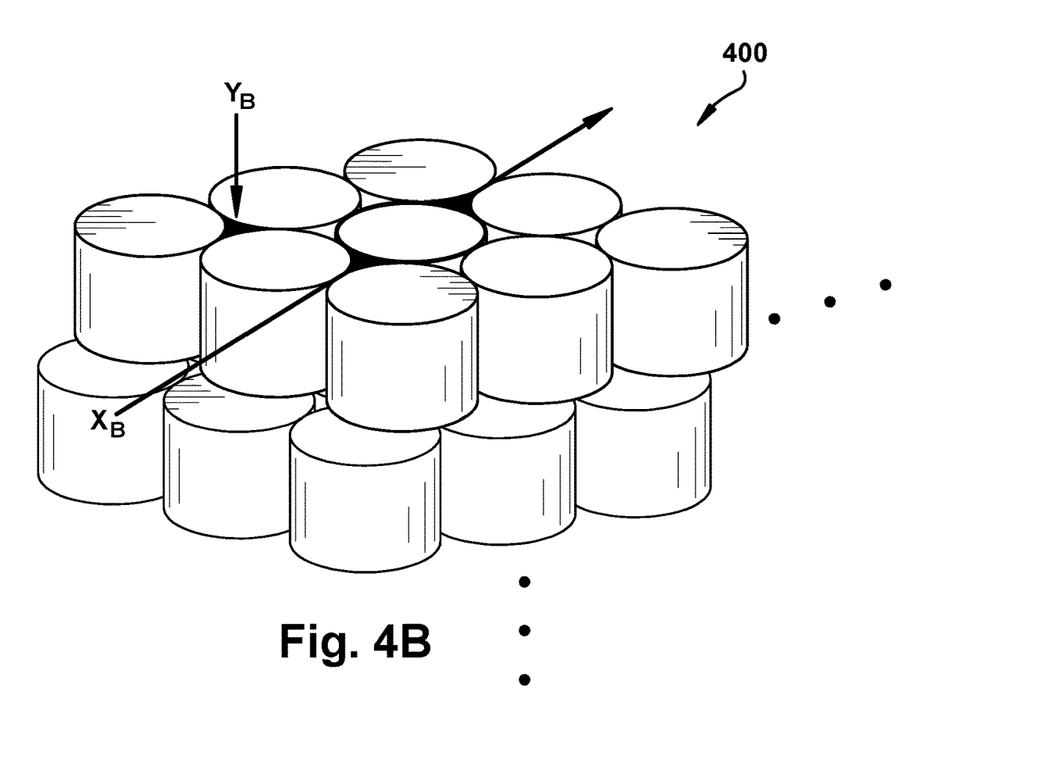
FIG. 4B is a schematic representation similar to FIG. 4A, and showing the packed bed of cylinder-shaped sponges arranged in a different configuration.

Referring to FIG. 4B, a schematic representation similar to FIG. 4A is illustrated. More specifically, FIG. 4B shows the packed bed of cylinder-shaped sponges 400 arranged in a different configuration, which is a honeycomb configuration. In the honeycomb configuration, layers of the sponges 400 are stacked in an offset manner. The cylinder-shaped sponges 400 are substantially the same size and have a packing density between about 72% and about 91%. In some embodiments, at least a portion of at least some of the sponges 400 are comprised of an open cell structure.

In some embodiments, at least some of the cylinder-shaped sponges 400 are comprised of PDMS. Alternatively, the sponges 400 can be coated with an oleophilic and/or a hydrophobic polymer. As an example, cellulose or polyurethane can be coated to give oleophilic and hydrophobic properties.

When the effluent stream flows "radially" towards the cylinder-shaped sponges 400 (i.e., in the direction of arrow "$X_B$" shown in FIG. 4B) in the honeycomb configuration of FIG. 4B, the effluent stream flows radially between the outer circumferential surfaces of the sponges. When the effluent stream flows "axially" towards the cylinder-shaped sponges 400 (i.e., in the direction of arrow "$Y_B$" shown in FIG. 4B) in the honeycomb configuration of FIG. 4B, the effluent stream flows axially in the longitudinal spaces between the sponges.

The $X_B$ flow path is more direct than the $Y_B$ flow path, and allows the effluent stream to pass more easily through the cylinder-shaped sponges 400. As such, the sponges 400 have less time to absorb oil in the $X_B$ flow path as compared to the $Y_B$ flow path. In contrast, the $Y_B$ flow path is more convoluted than the $X_B$ flow path, and slows down the effluent stream as it passes through the cylinder-shaped sponges 400. As such, the sponges 400 have more time to absorb oil in the $Y_B$ flow path as compared to the $X_B$ flow path. In the axial flow path $Y_B$, effluent that flows between the longitudinal spaces in one sponge layer is met by the face of a cylinder-shaped sponge in the next sponge layer. Accordingly, the effluent stream has to flow more around the cylinder-shaped sponges of the new sponge layers, resulting in more and better absorption of contaminants (e.g., oil droplets) from the effluent stream.

Figure 5A:
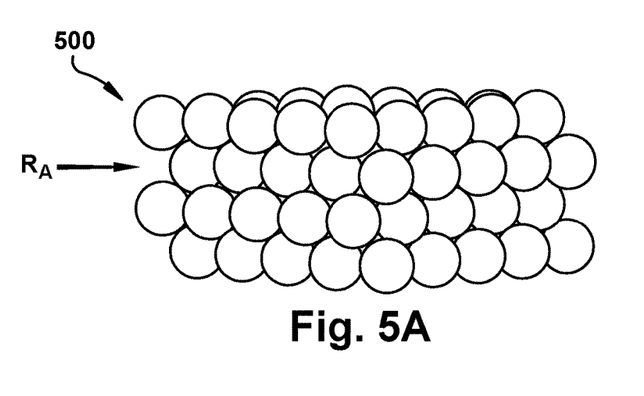
FIG. 5A is a schematic representation of an example packed bed of sphere-shaped sponges contained in the effluent processing apparatus of FIG. 2.

Referring to FIG. 5A, a schematic representation of an example packed bed of sphere-shaped sponges 500 contained in the effluent processing apparatus 200 of FIG. 2 is illustrated. More specifically, FIG. 5A shows a schematic representation of the filtration media 220 in the form of a packed bed of sphere-shaped sponges 500 contained in the effluent processing apparatus 200 of FIG. 2. The sphere-shaped sponges 500 are substantially the same size and have a packing density between about 64% and about 74%. In some embodiments, at least a portion of at least some of the sponges 500 are comprised of an open cell structure. When the effluent stream flows towards the sphere-shaped sponges 500 (i.e., in the direction of arrow "$R_A$" shown in FIG. 5A), the effluent stream flows between the outer spherical surfaces of the sponges.

In some embodiments, at least some of the sphere-shaped sponges 500 are comprised of PDMS. Alternatively, the sponges 500 can be coated with an oleophilic and/or a hydrophobic polymer. As an example, cellulose or polyurethane can be coated to give oleophilic and hydrophobic properties.

Figure 5B:
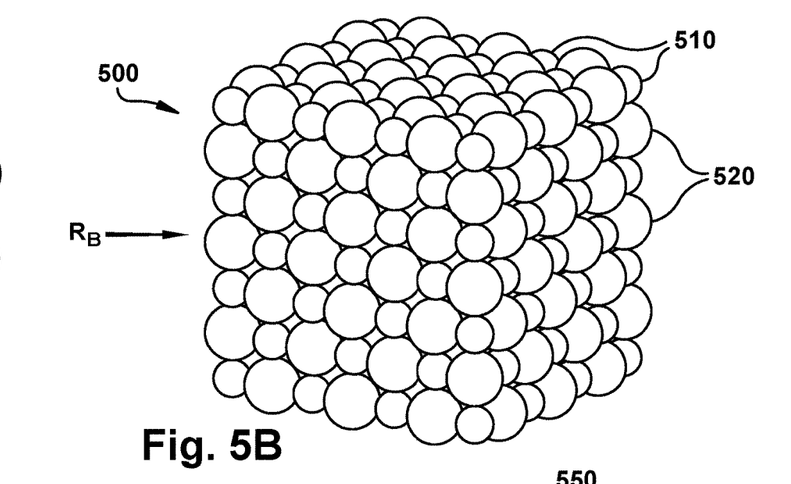
FIG. 5B is a schematic representation similar to FIG. 5A, and showing the packed bed of sphere-shaped sponges containing an equal number of spheres of two different sizes.

Referring to FIG. 5B, a schematic representation similar to FIG. 5A is illustrated. More specifically, FIG. 5B shows the packed bed of sphere-shaped sponges 500 containing an equal number of spheres of two different sizes (i.e., a smaller-size sphere and a larger-size sphere). The smaller-size spheres are designated with reference numeral "510", and the larger-size spheres are designated with reference numeral "520". The sphere-shaped sponges 500 have a packing density between about 64% and about 74%. In some embodiments, at least a portion of at least some of the sponges 510, 520 are comprised of an open cell structure.

In some embodiments, at least some of the sphere-shaped sponges 510, 520 are comprised of PDMS. Alternatively, the sponges 510, 520 can be coated with an oleophilic and/or a hydrophobic polymer. As an example, cellulose or polyurethane can be coated to give oleophilic and hydrophobic properties.

When the effluent stream flows towards the sphere-shaped sponges 510, 520 (i.e., in the direction of arrow "$R_B$" shown in FIG. 5B), the effluent stream flows between the outer spherical surfaces of the sponges. The combination of an equal number of smaller and larger size spheres 510, 520 allows for a high packing density with low compression. This is because the smaller-size spheres 510 fill the spaces between the larger-size spheres 520. By filling the spaces between the larger-size spheres 520 with the smaller-size spheres 510, the larger-size spheres 520 do not have to be compressed as much to obtain a given predetermined packing density. Accordingly, the oil-holding capacity of the larger-size spheres 520 is not reduced due to a higher compression of the larger-size spheres.

Figure 5C:
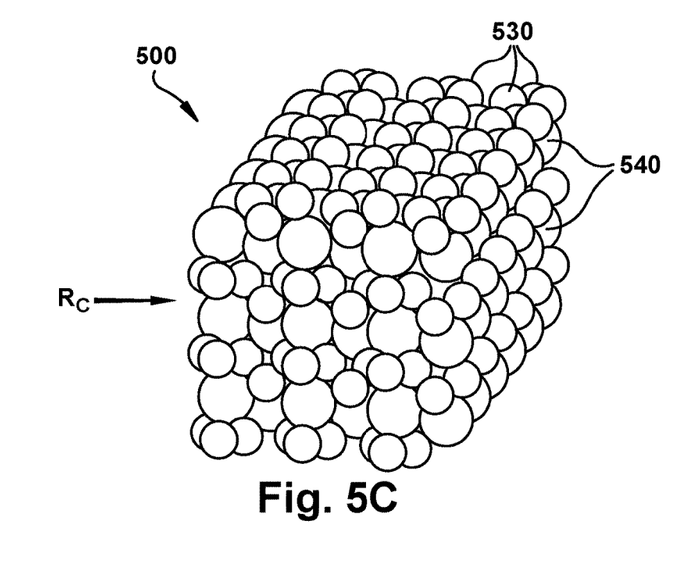
FIG. 5C is a schematic representation similar to FIG. 5A, and showing the packed bed of sphere-shaped sponges containing an unequal number of spheres of two different sizes.

Referring to FIG. 5C, a schematic representation similar to FIG. 5A is illustrated. More specifically, FIG. 5C shows the packed bed of sphere-shaped sponges 500 containing an unequal number of spheres of two different sizes (i.e., a smaller-size sphere and a larger-size sphere). The smaller-size spheres are designated with reference numeral "530", and the larger-size spheres are designated with reference numeral "540". In the embodiment shown in FIG. 5C, there are more smaller-size spheres 530 than larger-size spheres 540. In some embodiments, at least a portion of at least some of the sponges 530, 540 are comprised of an open cell structure. When the effluent stream flows towards the sphere-shaped sponges 500 (i.e., in the direction of arrow "$R_C$" shown in FIG. 5C), the effluent stream flows between the outer spherical surfaces of the sponges.

In some embodiments, at least some of the sphere-shaped sponges 530, 540 are comprised of PDMS. Alternatively, the sponges 530, 540 can be coated with an oleophilic and/or a hydrophobic polymer. As an example, cellulose or polyurethane can be coated to give oleophilic and hydrophobic properties.

Figure 5D:
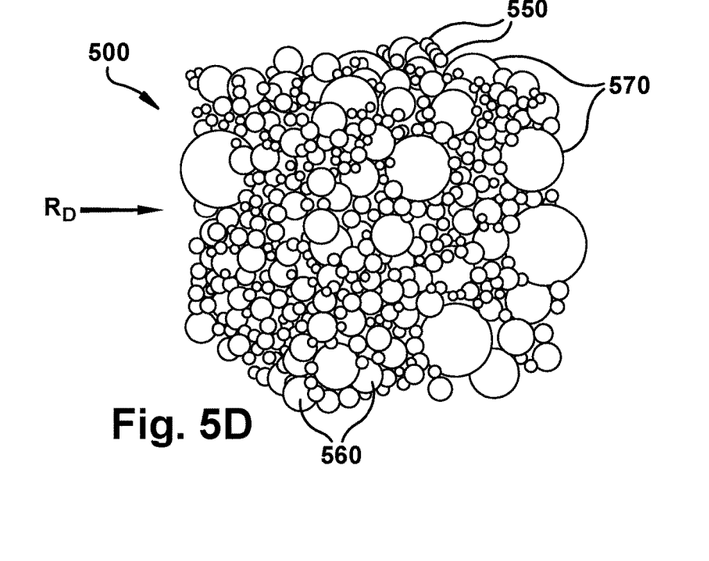
FIG. 5D is a schematic representation similar to FIG. 5A, and showing the packed bed of sphere-shaped sponges containing spheres of more than two different sizes.

Referring to FIG. 5D, a schematic representation similar to FIG. 5A illustrated. More specifically, FIG. 5D shows the packed bed of sphere-shaped sponges containing spheres of more than two different sizes. In the embodiment shown in FIG. 5D, there are at least three different-sized spheres designated with reference numerals "550", "560", and "570". In some embodiments, at least a portion of at least some of the sponges 550, 560, 570 are comprised of an open cell structure. When the effluent stream flows towards the sphere-shaped sponges 550, 560, 570 (i.e., in the direction of arrow "$R_D$" shown in FIG. 5D), the effluent stream flows between the outer spherical surfaces of the sponges.

In some embodiments, at least some of the sphere-shaped sponges 550, 560, 570 are comprised of PDMS. Alternatively, the sponges 550, 560, 570 can be coated with an oleophilic and/or a hydrophobic polymer. As an example, cellulose or polyurethane can be coated to give oleophilic and hydrophobic properties.

Figure 6:
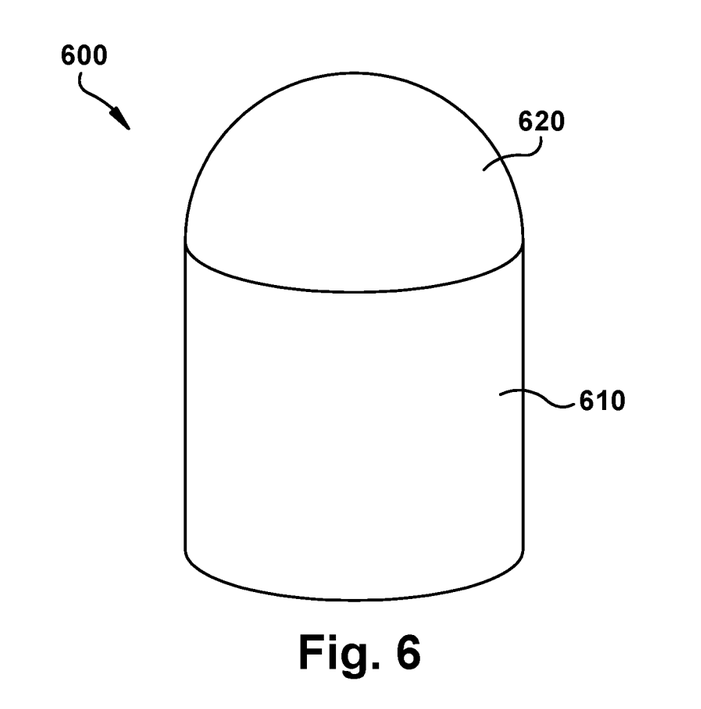
FIG. 6 is a schematic representation of an example bullet-shaped sponge that can be used in the effluent processing apparatus of FIG. 2.

Referring to FIG. 6, a schematic representation of an example bullet-shaped sponge 600 that can be used in the effluent processing apparatus 200 of FIG. 2 is illustrated. The bullet shape shown in FIG. 6 has a bottom portion 610 that is shaped like a cylinder and a top portion 620 that is shaped like a hemisphere. The hemisphere 620 on top of the cylinder 610 allows for packing properties closer to a sphere while being easier to manufacture than a sphere. The bullet-shaped sponge 600 has a packing density between about 72% and about 91%. In some embodiments, at least a portion of at least some of the sponges 600 are comprised of an open cell structure.

In some embodiments of a bed (not shown) of bullet-shaped sponges, at least some of the bullet-shaped sponges 600 are comprised of PDMS. Alternatively, the sponges 600 can be coated with an oleophilic and/or a hydrophobic polymer. As an example, cellulose or polyurethane can be coated to give oleophilic and hydrophobic properties.

Although the above description describes sponges having a cylinder-shape, a sphere-shape, or a combination of a cylinder-shape and a hemisphere-shape (i.e., a bullet-shape), it is conceivable that the sponges may have other shapes or combination of shapes.

Figure 7:
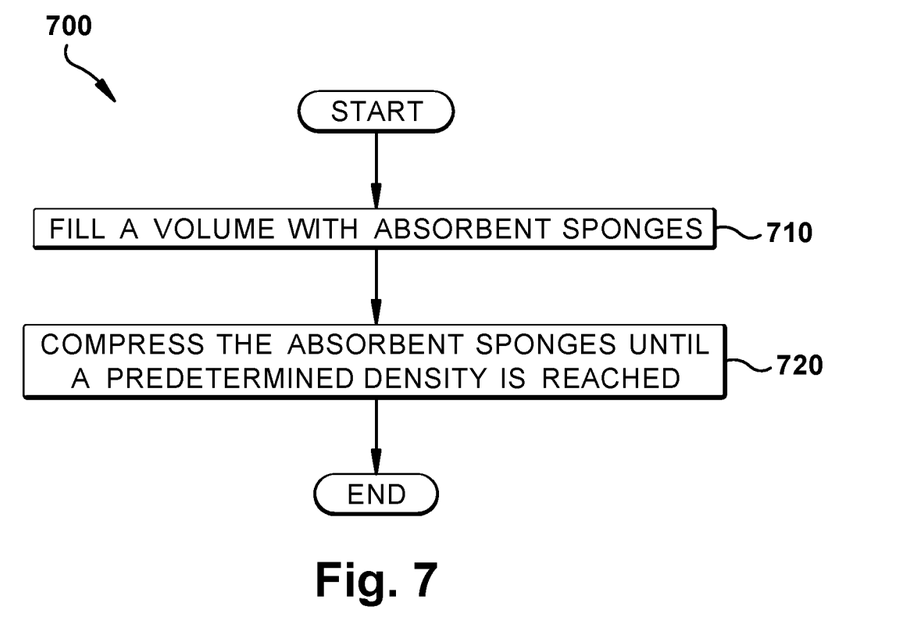
FIG. 7 is a flow diagram depicting an example method of producing an absorbent apparatus for an air dryer purge air cleaner in accordance with an embodiment.

Referring to FIG. 7, a flow diagram 700 depicts an example method of producing an absorbent apparatus for an air dryer purge air cleaner in accordance with an embodiment. In block 710, a volume (e.g., the separating sump 208 shown in FIG. 3) is filled with absorbent sponges that are both oleophilic and hydrophobic.

The absorbent sponges may comprise any shape that is suitable to be compressed into a predetermined packing density. Example sponge shapes include the cylinder-shaped sponges 400 shown in FIGS. 4A and 4B, the sphere-shaped sponges 500 shown in FIGS. 5A-5D, and the bullet-shaped sponge 600 shown in FIG. 6. The process then proceeds to block 720.

In block 720, the absorbent sponges contained in the volume are compressed until a predetermined packing density of the absorbent sponges is reached. The packing is affected by the pore size of each sponge, which pore size is related to the density of the sponge and therefore the mass of the sponge. In some embodiments, the absorbent sponges have an average dimension of about one centimeter (about 0.39 inches), and a maximum dimension of about two centimeters (about 0.79 inches). The process then ends.

In some embodiments, the filling of block 710 includes filling the volume of a select one of a separating sump, a mesh bag, a permeable sack, or a permeable cartridge with absorbent sponges from a select one of cylinder-shaped sponges, sphere-shaped sponges, or bullet-shaped sponges.

In some embodiments, the compressing of block 720 includes compressing the absorbent sponges contained in the volume until a predetermined packing density between about 64% and about 91% is reached.

The flow of the effluent stream into a sponge bed that is packed with a predetermined density increases extraction of contaminants (e.g., oil droplets) from the effluent stream. If the packing density is too low, the effluent stream passes through the sponge bed too quickly for sufficient oil to be absorbed. If the packing density is too high, the cell spaces within the sponge bed are too collapsed for enough oil to be absorbed.

It should apparent that the volume capacity of the sponge bed is reduced when the sponges are compressed. However, it is necessary to have spaces between the sponges to allow effluent water to flow, particularly when the sponges become fully saturated with oil. Once the sponges are saturated with oil, the effluent containing water needs to be allowed to flow around the sponges. The effluent will tend to take the path of least resistance, which could also be through a portion of a sponge as the sponge is open cell. By optimizing compression of a sponge bed to a predetermined packing density as disclosed herein, the flow paths through the sponges are not only restricted enough to slow the effluent to absorb oil but also unrestricted enough to allow for water to flow around the sponges.

Also, by providing a sponge bed with various sponge shapes and intermediate predetermined packing densities disclosed herein, emulsion breaking properties have been observed in a laboratory, which emulsion breaking properties have not been seen before in prior art sponge beds. As is known, an emulsion is a two-phase system in which both phases, dispersed and continuous, are liquids. In the case of the effluent stream of the present disclosure, oil is dispersed in the continuous medium of water. The result is cleaner air being expelled to atmosphere, and less oil being deposited and accumulated on roadways.

The density and bulk density of the sponges precisely control the compressibility of the packed bed of sponges within a given range to provide desired oil-absorbing features. The packed bed of absorbent sponges does not decompress once compressed. The density and bulk density of the sponges also determines the stability of the packed bed of absorbent sponges during use in a purge air cleaner.

The oil-absorbing properties of the packed bed of absorbent sponges can also be improved by using absorbent sponges comprised of PDMS. The packed bed of absorbent sponges can be coated and then packed to create desired or customized oil-absorbing features.

Although the above-description describes the effluent processing apparatus 200 being used in a heavy vehicle such as a truck, it is conceivable that the effluent processing apparatus 200 may be used in other types of heavy vehicles, such as busses for example. Moreover, the absorbent apparatus including the packed bed of absorbent sponges produced in accordance with example embodiments described hereinabove is suitable for any type of effluent processing apparatus. In particular, the absorbent apparatus including the packed bed of absorbent sponges produced can be used in any type of vehicle air dryer purge air cleaner application. It is also conceivable that the example absorbent apparatus including the packed bed of absorbent sponges and methods of making the absorbent apparatus may be implemented in any industry in accordance with the applicable industry standards.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An absorbent apparatus for an air dryer purge air cleaner, the absorbent apparatus comprising:
    a volume for containing absorbent material; and
    absorbent material that is both oleophilic and hydrophobic and is packed in the volume to provide a packed bed of absorbent material with a predetermined packing density; wherein the packed bed of absorbent material comprises sphere-shaped sponges, the sphere-shaped sponges comprising at least two different sizes and having a packing density between about 64% and about 74%.

2. An absorbent apparatus according to claim 1, wherein at least some of the sphere-shaped sponges are comprised of polydimethylsiloxane.

3. An absorbent apparatus according to claim 1, wherein the volume for containing absorbent material comprises a select one of a volume defined in a separating sump, a volume defined in a mesh bag, a volume defined in a permeable sack, or a volume defined in a permeable cartridge.

4. An absorbent apparatus according to claim 1, wherein at least a portion of at least some of the absorbent material is comprised of an open cell structure.

5. An effluent processing apparatus manufactured including the absorbent apparatus of claim 1.

6. An absorbent apparatus for an air dryer purge air cleaner of a vehicle air brake charging system, the absorbent apparatus comprising:
    a separating sump having a volume for containing absorbent material; and
    absorbent sponges comprising an absorbent material that is both oleophilic and hydrophobic, wherein the absorbent sponges are packed in the volume of the separating sump to provide a packed bed of absorbent sponges having a predetermined packing density between about 64% and about 91%.

7. An absorbent apparatus according to claim 6, wherein the packed bed of absorbent sponges comprises a select one of cylinder-shaped sponges having a packing density between about 72% and 91%, sphere-shaped sponges having a packing density between about 64% and 74%, or bullet-shaped sponges having a packing density between about 72% and about 91%.

8. An absorbent apparatus according to claim 7, wherein at least some of the absorbent sponges are comprised of polydimethylsiloxane.

9. An absorbent apparatus according to claim 6, wherein at least a portion of at least some of the absorbent sponges are comprised of an open cell structure.

10. An effluent processing apparatus manufactured including the absorbent apparatus of claim 6.

11. A method of producing an absorbent apparatus for an air dryer purge air cleaner, the method comprising:
    filling a volume with absorbent sponges that are both oleophilic and hydrophobic; and
    compressing the absorbent sponges contained in the volume until a predetermined packing density of between about 64% and about 91% of the absorbent sponges is reached.

12. A method according to claim 11, wherein filling a volume with absorbent sponges that are both oleophilic and hydrophobic includes:
    filling the volume of a select one of a separating sump, a mesh bag, a permeable sack, or a permeable cartridge with absorbent sponges from a select one of cylinder-shaped sponges, sphere-shaped sponges, or bullet-shaped sponges.

* * * * *